United States Patent [19]
Kumagai

[11] Patent Number: 5,204,617
[45] Date of Patent: Apr. 20, 1993

[54] LIQUID CRYSTAL PANEL INSPECTION METHOD

[75] Inventor: Ryohei Kumagai, Tokyo, Japan

[73] Assignee: Ezel, Inc., Tokyo, Japan

[21] Appl. No.: 780,053

[22] Filed: Oct. 21, 1991

[30] Foreign Application Priority Data

Oct. 22, 1990 [JP] Japan .................................. 2-283760

[51] Int. Cl.⁵ .......................................... G01R 31/28
[52] U.S. Cl. .................................. 324/158 R; 324/73.1
[58] Field of Search ............. 324/158 R, 158 T, 73.1, 324/719; 371/25.1; 340/765, 784

[56] References Cited

U.S. PATENT DOCUMENTS

| | | | |
|---|---|---|---|
| 4,819,038 | 4/1989 | Alt | 324/158 T |
| 4,843,312 | 6/1989 | Hartman et al. | 324/158 R |
| 5,057,775 | 10/1991 | Hall | 324/73.1 |

Primary Examiner—Ernest F. Karlsen
Attorney, Agent, or Firm—Cushman, Darby & Cushman

[57] ABSTRACT

An inspection method of liquid crystal panel by comparing characteristics of histogram of a part mounted on the panel with a reference histogram which is obtained from a part of the panel to be inspected.

9 Claims, 5 Drawing Sheets

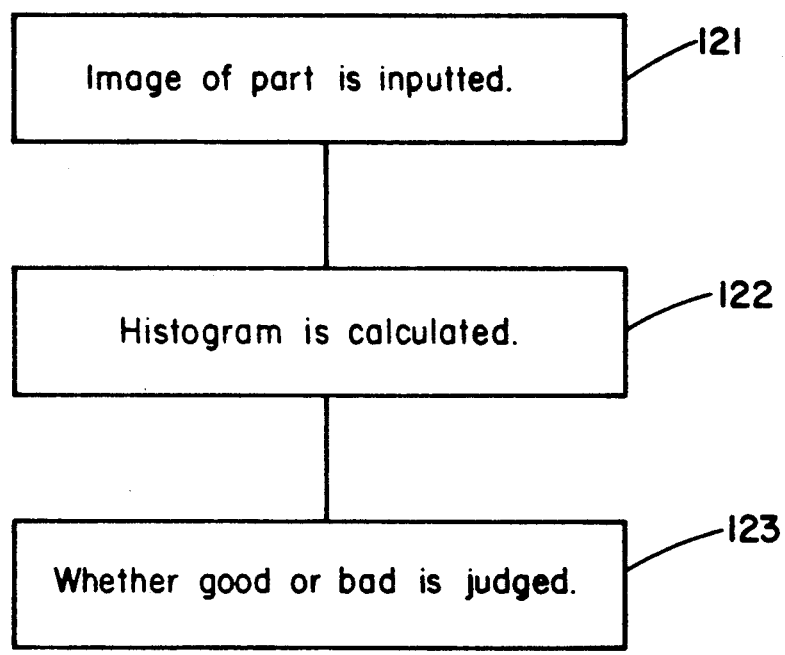

LIQUID CRYSTAL PANEL INSPECTION METHOD

FIELD OF THE INVENTION

The present invention relates to a inspection method for liquid crystal panel used for a display device of a computer and so fourth.

BACKGROUND OF THE INVENTION

When liquid crystal panels are manufactured, several percent of defective products occurs. Conventionally, the defective products are found out by eye-inspection. First, observing the luminousness of the surface of a panel energized, the defective parts are roughly found out. Next, observing each part of a defective liquid crystal panel in detail, it is inspected where the defective parts are and how the parts are defective.

SUMMARY OF THE INVENTION

Such eye-inspection is, however, very difficult. It takes about 4 hours to inspect one liquid crystal panel even for one skilled in the inspection. Inspection method for automatic inspection of IC may be applicable to the inspection of liquid crystal. This method is one of a pattern matching method, in such an IC image is compared with a blueprint. Since the parts on the liquid crystal has a thickness and rather three-dimensional, the edge of the parts appears as shadowy lines, differently from the flat surface of IC. The input apparatus for the image of liquid crystal is adjusted not to take the shadowy lines, however a part of the lines may be inputted due to optical aberration. In such an image, it is impossible to find out defective parts without fail by comparing the parts with a template.

The present invention is invented to provide a liquid crystal panel inspection method, by which it is possible for the unskilled to inspect whole of a liquid crystal panel accurately in a short time.

The liquid crystal panel inspection method according to the present invention is characterized in that a part is selected as a reference image in the parts group maximal number of members among groups classified according to characteristics value, then other parts to be extracted are compared with the reference part.

The liquid crystal panel inspection method according to the present invention is further characterized in that the judgment whether a part to be inspected has a defect or not is performed by comparing images of a liquid crystal panel to be inspected with a part image of no defect, observing the images by lighting from backside of them.

The liquid crystal panel inspection method according to the present invention is further characterized in that a liquid crystal panel to be inspected is inputted optically and is judged if it has a defect or not according to a characteristics of a histogram of the part.

BRIEF DESCRIPTION OF THE DRAWINGS

FIG. 7 shows a method for judging if a part is defectless or not which is inputted optically.

PREFERRED EMBODIMENT OF THE PRESENT INVENTION

Hereinafter, the present invention is described referring to the attached drawings.

Figure 3:
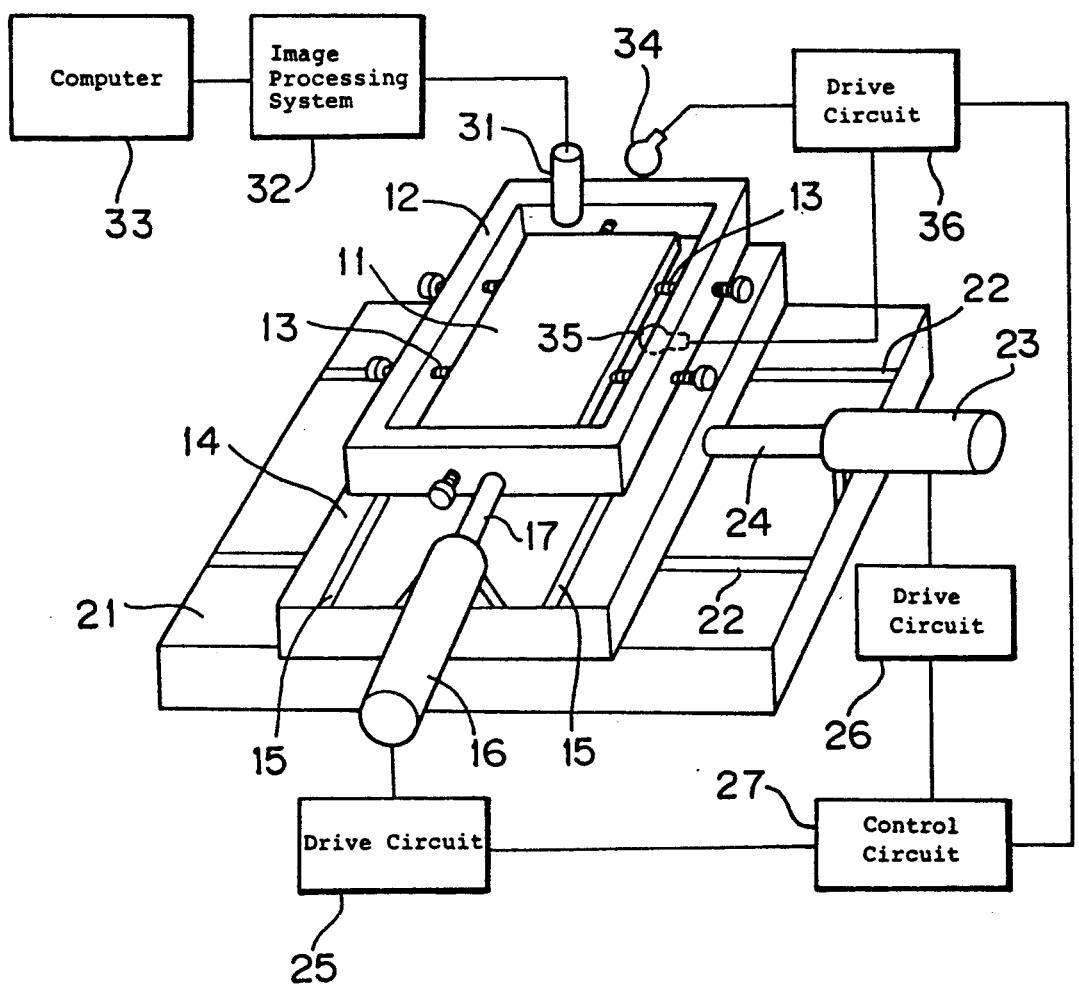
FIG. 3 is a perspective view of an apparatus used for the inspection method.

FIG. 3 shows an apparatus used for the present invention. A liquid crystal panel 11 is located inside of a support frame 12 so as to be fixed on the frame 12 with bolts 13. Support frame 12 movably mounted on a pair of rails 15 on a movable plate 14. A cylinder device 16 is fixed on an end of the movable plate 14, whose piston rod 17 is connected with the support frame 12. Movable plate 14 is movably mounted on a pair of rails 22 on fixed plate 21. Similar to the movable plate 14, the fixed plate 21 is provided with a cylinder device 23 at one end whose piston rod 24 is connected with the movable plate 14.

Support frame 12 is moved in parallel to movable frame 14 by controlling cylinder device 16, and movable plate 14 is moved in parallel to fixed plate 21 by controlling cylinder device 23. Cylinder devices 16 and 23 are driven by drive circuits 25 and 26, respectively, so as to move the piston rods 17 and 24 forward or backward. Drive circuits 25 and 26 are controlled by a control circuit 27.

A microscope 31 is supported by a fixed frame not shown above the liquid crystal panel 11. Each part equipped on liquid crystal panel 11 is inputted through the microscope 31, as described later. The image of this part is inputted to image processing system 32 and various processings are performed therein. Image processing system 32 is controlled by computer 33.

Light sources 34 and 35, such as stroboscope, are provided for lighting the support frame 12 from above and below, respectively. They are fixed to support frame 12 and move with it. Light sources 34 and 35 are driven by a drive circuit 36 which is controlled by the control circuit 27.

Figure 4:
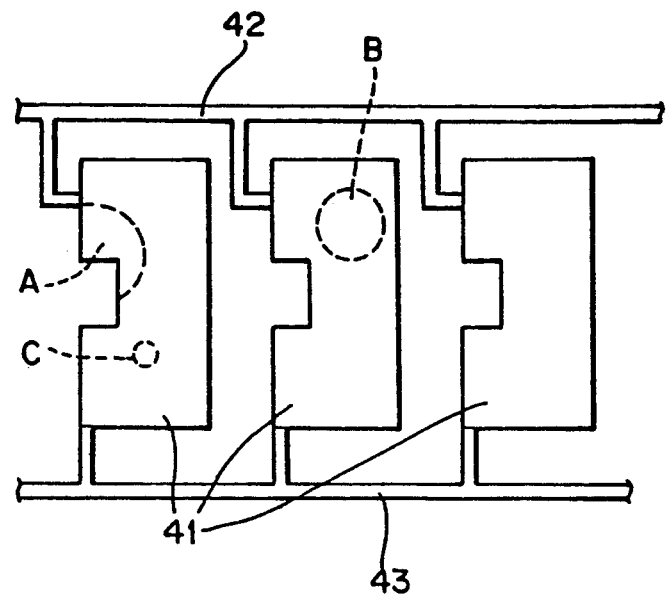
FIG. 4 is a plan view of an arrangement of parts of a liquid crystal panel.

As shown in FIG. 4, liquid crystal panel 11 includes a plurality of parts 41 mounted and arranged regularly on the panel. Each part 41 is driven to emit light by a voltage supplied through leads 42 and 43.

When a defect such as break A or big hole B is on part 41, the surface of the panel appears at the spot and light is not emitted there. When such a liquid crystal panel 11 is lighted, light reflects on the spot of a defect. When liquid crystal panel 11 with the part 41 including a defect such as pin point C is lighted, pin point C causes a shadow. When a liquid crystal itself has a defect, it sometimes appears the discolored into blackburned part with roughness. When a protect film is peeled off from the panel, a light blot appears on the spot. It is possible to occur a defect of rising leads 42 and 43 detached from the panel. Such a defect looks light when it is lighted from backside of liquid crystal panel 11 because of transparency of the panel.

Figure 1:
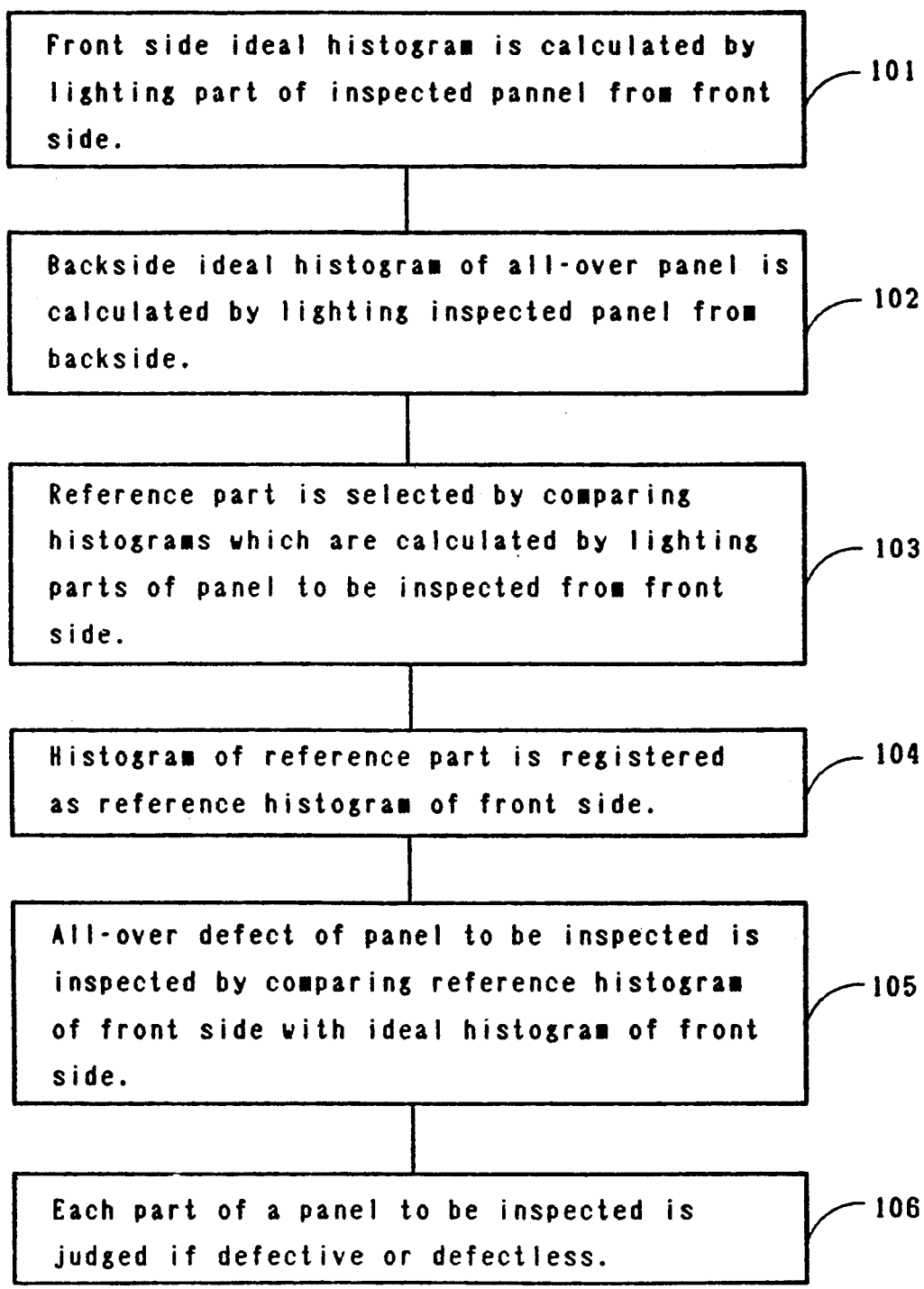
FIG. 1 shows the first embodiment of the inspection method.
Figure 2:
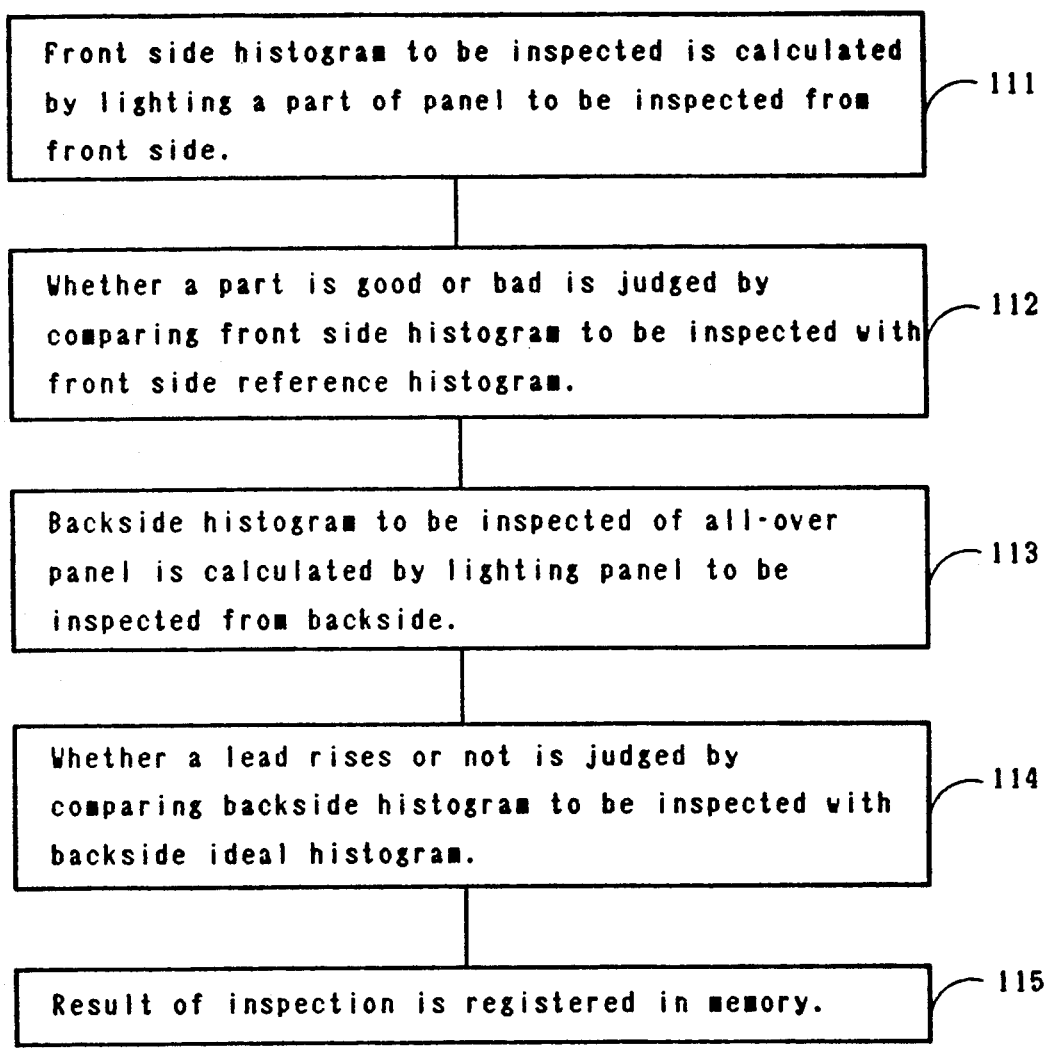
FIG. 2 shows the method for the judgment if each part is defectless or not.

FIG. 1 and FIG. 2 show an inspection method for finding such a defect. FIG. 1 shows the outline of inspection process and FIG. 2 shows details of the step 106 in FIG. 1.

In the steps 101 and 102 the liquid crystal panel is measured which has already been inspected which to be assured of defectlessness. The liquid crystal panel after the inspection is mounted on the inspection system in FIG. 3.

Figure 5:
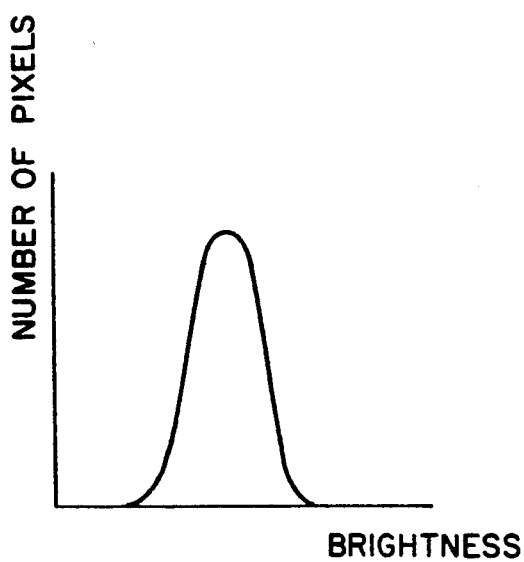
FIG. 5 shows a histogram of brightness distribution of an ideal histogram on front side.

On step 101, a liquid crystal panel is photographed by lighting from front side of it and the image of a part is inputted into image processing system 32. Image processing system 32 cooperates with a computer 33 to calculate the brightness of each pixel of inputted image with 256 monochrome densities and a histogram of each density is obtained by calculating the number of pixels of each density. This histogram is called front side ideal histogram here. The front side ideal histogram shows the brightness distribution of a part of inspected liquid crystal panel, having one peak as shown in FIG. 5. The most number of pixels belongs to the predetermined brightness and less number of pixels belongs to higher or lower brightness than the predetermined brightness as it follows.

On step 102, lighting inspected liquid crystal panel from backside, an image of a liquid crystal panel is inputted to image processing system 32. As the image is not a part but a whole of liquid crystal panel, a video camera is used in place of microscope 31. Image processing system 32 and computer 33 are used for calculating the histogram of brightness distribution of an inputted image. This histogram is called an backside ideal histogram here. The backside ideal histogram is a distribution of brightness when an inspected liquid crystal panel is lighted from backside. Since leads 42 and 43 of an inspected liquid crystal panel do not rise from the panel, light do not pass through the panel. Therefore, a lot of pixels belongs to low brightnesses.

Steps from 103 to 106 are for the measurement and judgment of the liquid crystal panel if it is defective or not. This liquid crystal panel to be inspected is mounted on the inspection system in FIG. 3.

On step 103, lighting from front side and photographing a liquid crystal panel to be inspected, an image of a part is inputted to image processing system 32. In the same way as on step 101, a histogram of brightness distribution is calculated with observing each pixel of the image. A part belonging to a major group in classification of characteristics is selected as a reference part by calculating such a histogram and by comparing the histograms with one another. The reference part is decided by a majority. For example, the one which belongs to the group with the maximal number of similar histograms is decided as a reference part. The histogram of the reference part is registered in the memory of computer 33 as the front side reference histogram in step 104.

On step 105, comparing the front side reference histogram registered on step 104 with the front side ideal histogram calculated on step 101, the liquid crystal panel to be inspected is judged to be defectless in all-over when the histograms are similar to each other. The "all-over defect" means the discolored into black-burned part with roughness, or light blot generated by peeling off of protect film from a panel. When such defects exist, the histograms of them show many pixels on low brightness, or wide distribution on a lot of brightnesses.

There are some methods for comparing the front side reference histogram with front side ideal histogram. For example, when subtraction is performed on each brightness concerning to these histograms, and the difference of the number of pixels on each brightness is smaller than the predetermined threshold, it means these histograms are similar to each other. It can be judged that the liquid crystal panel to be inspected has none of all-over defect. When the secondary moment is calculated around vertical axis for each histogram, and the difference of these secondary moment is within the predetermined range, it can be judged that the liquid crystal panel to be inspected has none of all-over defect. If the liquid crystal panel to be inspected has an all-over defect or not can be judged by comparing the distribution after calculating the distribution of the brightnesses from each histogram.

On step 105, when an all-over defect is found out on a panel to be inspected, the inspection process is terminated here. When such a defect is not found out, each part of the liquid crystal panel to be inspected is judged the quality on step 106. FIG. 2 shows the processing in step 106 in detail.

Step 111 and 112 judge the existence of a break A, a big hole B and pin point C (such as in FIG. 4), which are executed one by one to all the parts of a liquid crystal panel to be inspected. In order to execute it, liquid crystal panel 11 is controlled its location by cylinder device 16 and 23 for predetermined part of it to be just under microscope 31, as shown in FIG. 3, every time steps 111 and 112 are executed.

Figure 6:
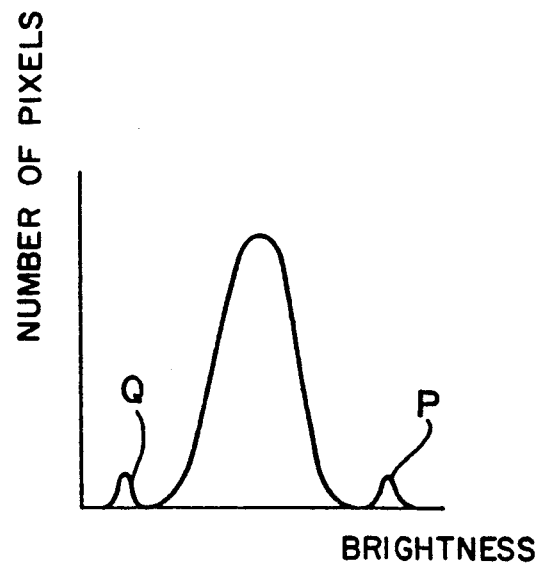
FIG. 6 shows a histogram of brightness distribution of a part with defect.

On step 111, a panel to be inspected is lighted from the front side and photographed, and an image of a part is inputted to image processing system 32. Image processing system 32 and computer 33 calculate the histogram of brightness distribution of inputted image in the same way as in step 101. This histogram is called "histogram to be inspected on the front side". When the part is normal, the histogram to be inspected on the front side shows a simple wavy line with one peak as shown in FIG. 5. On the other hand, when a defect such as break A or big hole B exists, light reflects at the defects because of the bareness of the panel. It causes a peak of histogram of high brightness as shown by "P" in FIG. 6. When a defect such as pin point C exists, the part of pin point C shows black shadow. It causes a peak of histogram on low brightness as shown by "Q" in FIG. 6.

On step 112, comparing the histogram to be inspected on the front side calculated on step 111 with the reference histogram on the front side, the part is judged to be defectless when their histogram are similar to each other. The defect which can be inspected on this step are break A, big hole B and pin point C described above. On step 112, the existence of such defects is inspected by recognizing the peak of histogram shown by "P" or "Q" in FIG. 6. Various methods are possible for the comparison of histogram to be inspected on the front side and the reference histogram on the front side, similarly to the comparison on step 105. That is, the methods consists of steps of i) to compare the difference of pixels on each brightness with the threshold after subtracting each histogram, ii) to compare the secondary moments of each histogram, iii) to compare the distribution of brightness calculated from each histogram.

In this way on step 112, the reference histogram on the front side which is a characteristics value of an image of a reference part is compared with the histogram to be inspected on the front side which is a characteristics value of an image of a part to be inspected. The part to be inspected is judged to be defectless or not.

Steps 113 and 114 are judgment of the existence of rising leads 42 and 43 from the panel, which are executed by lighting from the back side of a liquid crystal panel to be inspected. Liquid crystal panel 11 is lighted by lighting source 35 below it, as shown in FIG. 3, and taken a movie by a video camera equipped in place of microscope 31.

On step 113, the histogram of brightness distribution is calculated after inputting the image whole of liquid crystal panel into image processing system 32 lighted from backside of the panel to be inspected. The histogram is called "backside histogram to be inspected". When leads 42 and 43 on a liquid crystal panel to be inspected do not rise from the panel, the histogram has high peak on low brightness because the panel is opaque to the light from backside substantially. On the other hand, when a part has leads 42 or 43 rising from the panel, the histogram has peak on high brightness because the light lighted from backside passes through the part.

On step 114, backside histogram to be inspected is compared with the ideal histogram of backside calculated in step 102. When these histogram are similar to each other, leads 42 and 43 are judged not risen from the liquid crystal panel to be inspected. On the other hand when a backside histogram to be inspected has high peak on high brightness, and the backside histogram to be inspected and the ideal histogram of backside are not similar to each other, it is judged that leads 42 or 43 rise from the panel on some part of liquid crystal panel to be inspected.

On step 115, the results of the inspection above are registered to the memory of computer 33. The result of the inspection can be seen on a display which is not shown in the figure.

There is another method for inspecting the existence of the rise of leads 42 and 43 from the panel. That is, binarizing the image of a liquid crystal panel, the rise of a lead is found out when the number of the pixels with high brightness is more than the predetermined value.

FIG. 7 shows the method for judging if the part is defectless or not by the characteristic of the histogram inputted optically, without inputting the reference part.

On step 121, lighting and photographing the part of a liquid crystal panel to be inspected, the image of a part is inputted to image processing system 32. On step 122, image processing is performed to the part and the histogram is calculated. On step 123, the part is judged if it is defectless or not according to the characteristic of the histogram. Various characteristics are useful for the above judgment, that is, the secondary moment, correlation, statistic characteristics etc. Eye-inspection of the histogram is applicable, as a matter of course. In the embodiment above, the reference histogram is obtained from a part selected in the major group: the histogram can be obtained by calculating a mean value or other statistics value of histograms of the parts of the group selected.

As mentioned above, it is possible for unskilled to inspect the total surface of a liquid crystal panel accurately in short time by the present invention.

What is claimed is:

1. An inspection method of liquid crystal panel for judging if a part of said liquid crystal panel is defective or not comprising steps of:
    taking an image of said liquid crystal panel with lighting said panel;
    calculating histograms of parts mounted on said liquid crystal panel from said image;
    classifying said parts into groups according to characteristics value of said histogram;
    selecting one group with maximal number of members from said groups;
    selecting a reference histogram from histograms of said parts of said group selected; and
    comparing histograms of parts belonging to other groups than said groups selected with said reference histogram so that a defective part is extracted as defective part when a difference is greater than a predetermined value between said histogram of said parts of said other groups and said reference histogram.

2. An inspection method of liquid crystal panel as claimed in claim 1, wherein said reference histogram is obtained by calculating a mean value of histograms of said parts of said group selected.

3. An inspection method of liquid crystal panel as claimed in claim 1, wherein said reference histogram is obtained by selecting one part in said group selected.

4. An inspection method of liquid crystal panel as claimed in claim 1, wherein said panel is lighted from front side of said panel whereby defects of break, big hole and pin point, roughness and light blot are detected.

5. An inspection method of liquid crystal panel as claimed in claim 1, wherein said panel is lighted from back side of said panel whereby defects of rising lead is detected.

6. An inspection method of liquid crystal panel as claimed in claim 1, wherein said characteristics value is number of pixels of each brightness of said histogram.

7. An inspection method of liquid crystal panel as claimed in claim 1, wherein said characteristics value is second moment of said histogram.

8. An inspection method of liquid crystal panel as claimed in claim 1, wherein said characteristics value is variance of said histogram.

9. An inspection method of liquid crystal panel as claimed in claim 6, wherein said characteristics value is compared by subtracting number of pixels of each brightness of said histograms to be compared with each other.

* * * * *